April 25, 1950 C. J. LUCIA 2,505,713
SUPERCHARGER DRIVING MECHANISM
Filed April 6, 1944
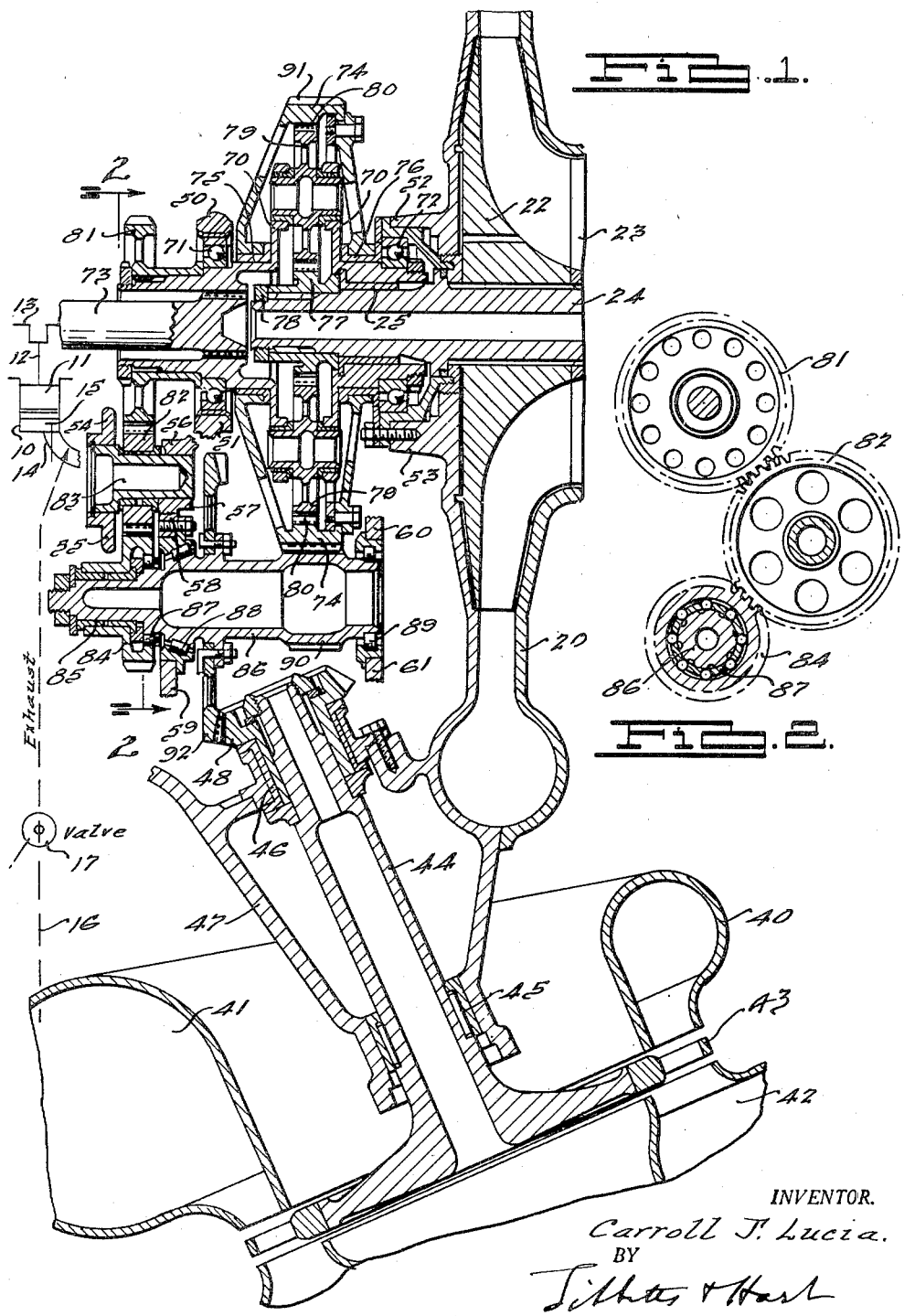
INVENTOR.
Carroll J. Lucia.
BY
Tibbetts & Hart
ATTORNEY.

Patented Apr. 25, 1950

2,505,713

UNITED STATES PATENT OFFICE 2,505,713

SUPERCHARGER DRIVING MECHANISM

Carroll J. Lucia, Detroit, Mich., assignor to Packard Motor Car Company, Detroit, Mich., a corporation of Michigan Application April 6, 1944, Serial No. 529,735

11 Claims. (Cl. 74—675)

This invention relates to supercharger driving mechanism. It has to do particularly with an internal combustion engine in which the explosive mixture is fed to the engine by a blower or supercharger. It is particularly adapted for use in airplane engines in which various degrees of supercharging are desirable at different altitudes.

Specifically the invention provides a step-up gearing from the engine crackshaft to the supercharger with an added turbine drive which produces an infinite number of speeds above the geared speed. Thus there is a combination geared and turbine drive, the latter coming into operation either automatically as by control of an aneroid or similar device, or manually.

In the conventional two-speed drive for superchargers there is one gearing for the lower speed drive and another gearing for the higher speed drive, and the change is usually made by means of shifting gears or clutches or both. Thus the change from one drive to the other is abruptly made whereas it is of course more desirable to graduate the change from the lower gear to the higher so that there will be less shock to the mechanism and so that the higher speeds of the supercharger will follow to some extent the increased altitude being attained by the plane.

There are also turbine driven superchargers in which the speed of the supercharger is increased with altitude, but where the turbine is the sole drive for the supercharger the back pressure on the engine exhaust is increased to a point where it interferes with the power of the engine and too largely offsets the additional power provided by the supercharger.

One of the objects of the present invention is to provide a combined gear drive and turbine drive for a supercharger whereby a smooth or shockless transfer is made from a lower to an infinite number of higher speeds.

Another object of the invention is to provide a geared drive for the lower speed of the supercharger and a graduated increased driving mechanism above that speed.

Another object of the invention is to provide an exclusively geared step-up drive for the lower speed of a supercharger and a combined geared and turbine drive for the higher speeds.

Another object of the invention is to provide a drive for a supercharger in which the planetary step-up gearing has two of its elements separately driven from the crankshaft.

Other objects of the invention will appear from the following description taken in connection with the drawings which form a part of the specification, and in which Fig. 1 is a sectional view of a mechanism embodying the invention; and Fig. 2 is a somewhat diagrammatic view of three of the gears of the mechanism, taken on the line 2—2 of Fig. 1.

Referring to the drawings, the internal combustion engine is represented diagrammatically by a cylinder 10, piston 11, connecting rod 12, and crankshaft or power shaft 13. The exhaust port of the cylinder is shown at 14 and the exhaust valve at 15.

The supercharger 20 is of conventional form. A carburetor may be connected at the mouth 23 of the supercharger and the rotor 22 is driven by shaft 24, being suitably splined thereto as shown.

The turbine of this invention is indicated somewhat diagrammatically at 40, the inlet side 41 thereof being connected with the exhaust port 14 of the engine, as by the diagrammatically shown pipe 16 controlled by the valve 17. The turbine outlet side 42 is open to the atmosphere. The rotor of the turbine is indicated at 43 and is connected to a power shaft 44 extending substantially crosswise, by which shaft it may drive or be driven as will hereinafter appear. Separated bearings 45 and 56 support the shaft 44 in a casing or support 47 which may, as shown, be an integral part of the casing or supporting portion of the supercharger 20.

Between the engine crankshaft 13 and the shaft 24 of the supercharger there is provided a step-up gearing which will now be described. This step-up gearing is mounted in bearings in a support or casing only fragmentary parts of which, for clarity, are shown in the drawings. These supports may be in one or several pieces and may or may not be connected directly to the casing of the supercharger 20 or the casing 47 of the turbine. These supporting parts are identified by the numerals 50, 51, 52, 53, 54, 55, 56, 57, 58, 59, 60, and 61, and they are all crosshatched alike and like the supports and casings for the supercharger and the turbine.

The lower speed drive is through a planetary or epicyclic gearing comprising the three conventional elements (a) a planet gear carrier 70 with its planetary pinions 79, (b) a sun gear 77 meshing with the planet gears, and (c) a ring gear 74 having internal teeth 80 meshing with the planet gears. The gear carrier 70 is mounted in bearings 71 and 72 in the casing and provides a steady bearing 25 for the supercharger shaft 24. It is driven by an extension shaft 73 from the engine crackshaft 13. The sun gear 77 is splined to the supercharger shaft 24 and is held thereon by a nut 78. The ring gear 74 is mounted on bearings 75 and 76 on the hubs of the carrier 70. Two planetary pinions 79 are shown in the drawing but there may be three or four of such pinions for the purpose of distributing the load.

Assuming for the moment that the ring gear 74 is held stationary, the drive from the engine crankshaft to the supercharger would be direct to the carrier 70 which would tend to carry the planetary pinions around the axis of the supercharger shaft, but the meshing of those pinions with the internal gear 80 of the stationary ring gear and with the teeth of the sun gear 77 will cause the latter gear to be rotated at a higher speed than that of the gear carrier 70. In other words, there would be a step-up gearing between the crankshaft and the supercharger shaft.

If, instead of holding the ring gear stationary, means are provided for rotating it with or against the rotation of the gear carrier, the speed of the supercharger would be relatively decreased or increased, as the case may be. In the present invention means are provided for rotating the ring gear against or in a direction the reverse of that of the gear carrier 70 so that thereby the speed of the supercharger will be stepped up to a greater extent than as though the ring gear were merely held in a stationary position. Thus there is a gear 81 driven by the crankshaft and shown as mounted upon a sleeve extension of the carrier 70. The gear 81 meshes with a gear 82 on a shaft 83 and said gear 82 meshes with a smaller gear 84 mounted on a bearing 85 on a lay or counter shaft 86 and is connected to drive that shaft through a one-way or overrunning clutch 87. (See Fig. 2.) Shaft 86 is mounted on bearings 88 and 89 on the supporting structure. On the lay shaft 86 is a spur gear 90 which meshes with spur gear teeth 91 on the outer surface of the relatively larger ring gear 74 of the planetary gearing.

Since the gear 84 is substantially smaller than the gear 81 there is a step up from the crankshaft to the lay shaft 86, and by reason of the intermediate gear 82 the shaft 86 is driven in the same direction as the crankshaft. But with the drive from the lay shaft 86 to the ring gear 74 through the gear 90 and gear teeth 91, the ring gear will be driven at a much slower speed than the lay shaft 86 and in a direction the reverse of that of the engine crankshaft.

It will be seen that the gearing so far described, if uninfluenced by the turbine above referred to, will drive the supercharger shaft 24 from the engine crankshaft 13 at an increased speed, first by reason of the planetary gearing and second by reason of the geared drive through the lay shaft 86 to the ring gear 74 driving the latter in a reverse direction.

For the infinite speeds above the geared speed provision is made for a non-mechanical driving connection between the engine and the lay shaft 86. This includes the turbine and its drive means from the engine exhaust. From the turbine 40 the drive is from its bevel gear 48 to a much larger bevel gear 92 on the lay shaft 86. Since this bevel gear connection of the turbine to the lay shaft 86 is between the overrunning clutch 87 and the ring gear 90, the turbine may pick up the lay shaft and operate it at an increased speed, thereby increasing the reverse speed of the ring gear 74 and consequently increasing the step-up of speed from the engine to the supercharger. This step-down bevel gearing 48, 92 and the gearing 90, 74 form a double step-down gearing from the turbine to the planetary gearing which makes for a more advantageous operating speed of the turbine.

With the turbine cut off from the engine exhaust, as may be done with the valve 17, it is idly driven through the gears 81, 82, 84 and 92, 48, and the lower speed is imparted to the supercharger. As the plane reaches the higher altitude the exhaust is fed to the turbine, which causes it to rotate faster than it is being gear driven from the engine and by reason of the overrunning clutch 87 the lay shaft 86 is speeded up and the ring gear 74 is rotated in its reverse direction at an even higher speed and this of course increases the speed of the supercharger. Thus an infinite number of speeds may be obtained above the geared speed, limited only by the power and speed of the turbine and the manual or automatic control of the exhaust from the engine.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

What is claimed is:

1. In combination, a power shaft, a driven shaft, planetary gearing connecting said shafts, a lay shaft, means for driving the lay shaft from the power shaft including a step-up gearing from said power shaft to the lay shaft including a one-way clutch to drive the lay shaft, step-down gearing between said lay shaft and said planetary gearing, a second power shaft, and step-down gearing between said second power shaft and said lay shaft.

2. In combination, a power shaft, an aligned driven shaft, planetary gearing connecting said shafts, a parallel lay shaft, gearing from said power shaft to drive said lay shaft in the same direction as said power shaft, said latter gearing drive including a one-way clutch, gearing between said lay shaft and an element of said planetary gearing to drive said element in a direction opposite to that of the power shaft, a second power shaft, and step-down gearing between said second power shaft and said lay shaft.

3. A supercharger drive comprising a driving shaft, an aligned driven shaft, a planetary gear carrier direct-connected to the driving shaft, a sun gear direct-connected to the driven shaft, a ring gear, planetary pinions mounted on said carrier and meshing with said sun gear and said ring gear, gears driving through a one-way clutch and connecting said driving shaft to said ring gear to drive the latter in a reverse direction, and a second driving shaft geared to said gears between the one-way clutch and said ring gear.

4. A supercharger drive comprising a driving shaft, an aligned driven shaft, a planetary gear carrier direct-connected to the drive shaft, a sun gear direct-connected to the driven shaft, a ring gear, planetary pinions mounted on said carrier and meshing with said sun gear and said ring gear, and gears connecting said driving shaft to said ring gear to drive the latter in a reverse direction.

5. Step-up gearing between driving and driven shafts comprising planetary gear mechanism, a connection from the driving shaft to the planet gear carrier of said mechanism, a connection from the sun gear of said mechanism to the driven shaft, and separate unidirectional gearing from the driving shaft to the ring gear of said mechanism.

6. The combination with first and second driving shafts and a driven shaft, of a step-up planetary gearing between the first driving shaft and the driven shaft including a ring gear, two step-up gearings arranged in series from the first driving shaft to the second driving shaft including an overrunning clutch, and two step-down gearings arranged in series from the second driving shaft to said ring gear, said double step-down gearing including some of the gears of said double step-up gearing.

7. The combination with first and second driving shafts and a driven shaft, of a step-up drive from the first said driving shaft to the driven shaft comprising a planetary gearing one element of which is connected for direct drive from said first driving shaft and another element of which is connected for a geared drive through a one-way clutch from said first driving shaft and the third element of which is connected to the driven shaft, and means connecting said second driving shaft to the gear driven element of said planetary gearing, said latter means being so proportioned and said one-way clutch being so situated that said latter element may be driven by said second driving shaft to overrun the connection from the first said driving shaft.

8. The combination with first and second driving shafts and a driven shaft, of a step-up drive from the first said driving shaft to the driven shaft comprising a planetary gearing one element of which is connected for direct drive from said first driving shaft and another element of which is connected for a geared-down drive in the opposite direction from said first driving shaft and the third element of which is connected to said driven shaft, and means connecting said second driving shaft to the gear driven element of said planetary gearing for driving said element.

9. The combination with first and second driving shafts and a driven shaft, of a step-up drive from said first driving shaft to said driven shaft comprising a planetary gearing having a planetary gear carrier element, a ring gear element and a sun gear element, the planetary gear carrier element of which is connected for direct drive from said first driving shaft, the ring gear element of which is connected through a one-way clutch for a geared drive from said first driving shaft and in the opposite direction from that of the latter, and the sun gear element of which is direct connected to said driven shaft, and means connecting said second driving shaft to said ring gear element for driving the latter.

10. A supercharger drive comprising a first driving shaft, a second driving shaft, and a driven shaft, a planetary gearing comprising three main elements, viz., (a) a planetary gear carrier and planet gears thereon, (b) a sun gear meshing with the planet gears, and (c) a ring gear meshing with the planet gears, one of said elements directly connected to the first driving shaft, another of said elements connected to the driven shaft, and the third of said elements connected for unidirectional drive from said second driving shaft.

11. A supercharger drive comprising a first driving shaft, a second driving shaft, and a driven shaft, a planetary gearing comprising three main elements, viz., (a) a planetary gear carrier and planet gears thereon, (b) a sun gear meshing with the planet gears, and (c) a ring gear meshing with the planet gears, said carrier directly connected to the first driving shaft, gearing for separately driving the ring gear from the first driving shaft and including an overrunning clutch connection, gearing driven by the second driving shaft and connected between the second driving shaft and the ring gear for overdriving that portion of the separate driving gearing which lies between said overrunning clutch connection and said ring gear, and means connecting the sun gear with the driven shaft.

CARROLL J. LUCIA.

REFERENCES CITED

The following references are of record in the file of this patent:

UNITED STATES PATENTS

| Number | Name | Date |
| --- | --- | --- |
| 1,949,203 | Havill | Feb. 27, 1934 |
| 1,992,210 | Higley | Feb. 26, 1935 |
| 2,128,477 | Schlosser | Aug. 30, 1938 |
| 2,149,785 | Neugebauer | Mar. 7, 1939 |
| 2,310,115 | Popoff | Feb. 2, 1943 |
| 2,363,201 | Popoff | Nov. 21, 1944 |

FOREIGN PATENTS

| Number | Country | Date |
| --- | --- | --- |
| 474,259 | Great Britain | Oct. 28, 1937 |
| 753,517 | France | Aug. 12, 1933 |